United States Patent Office 3,426,856
Patented Feb. 11, 1969

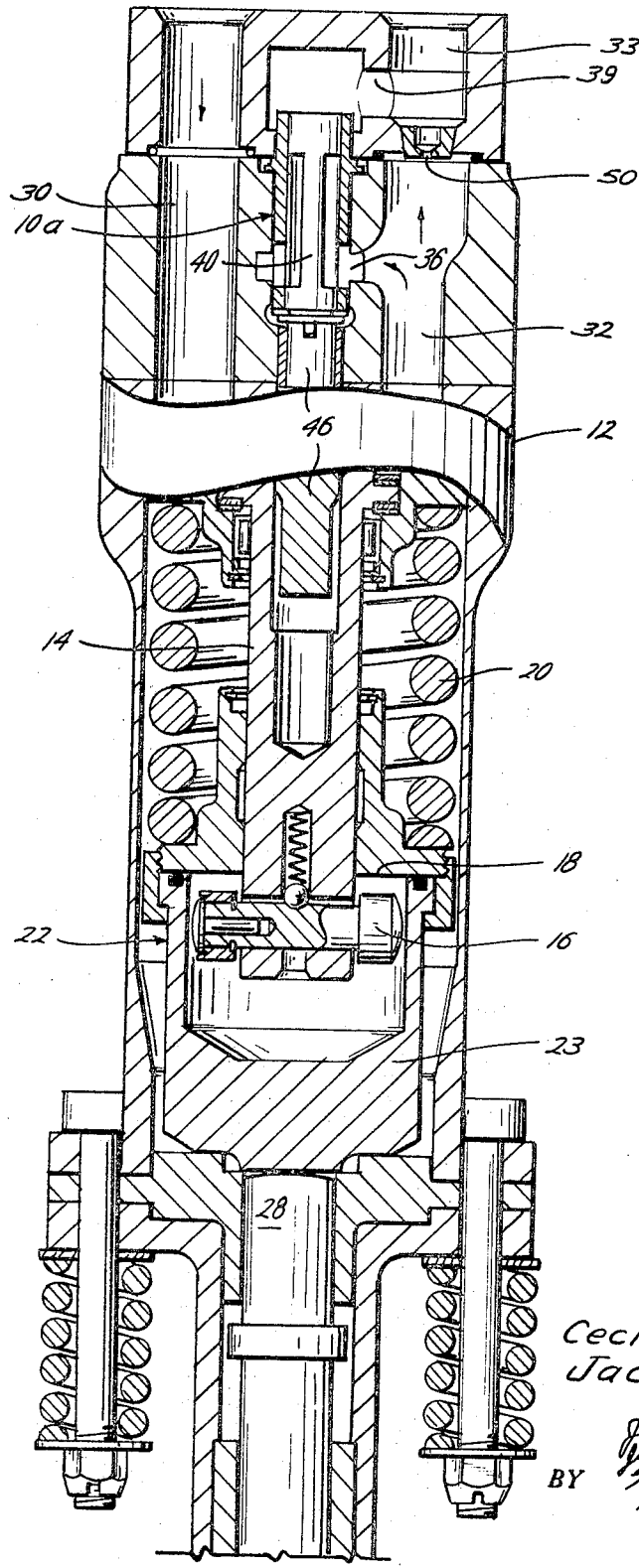

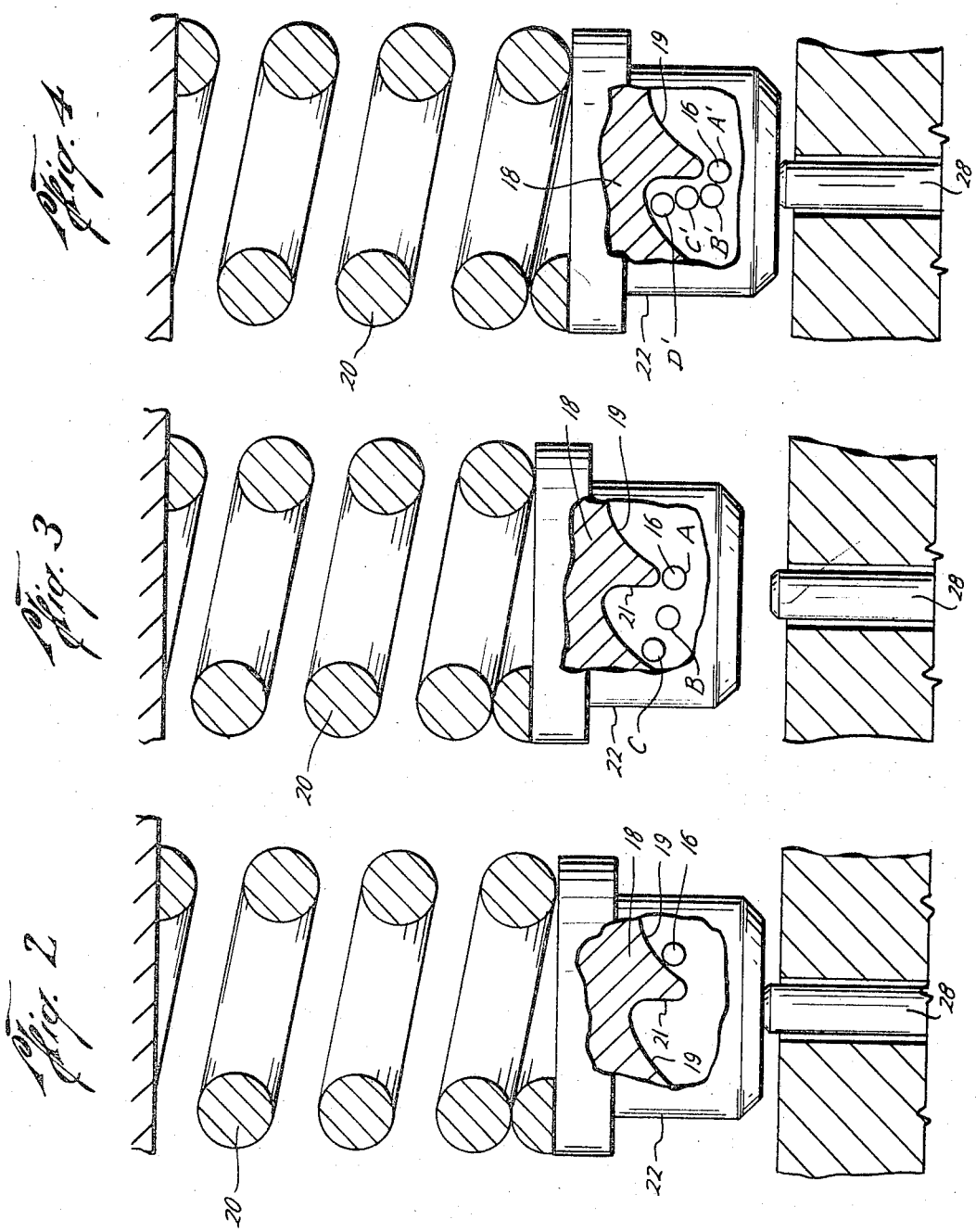

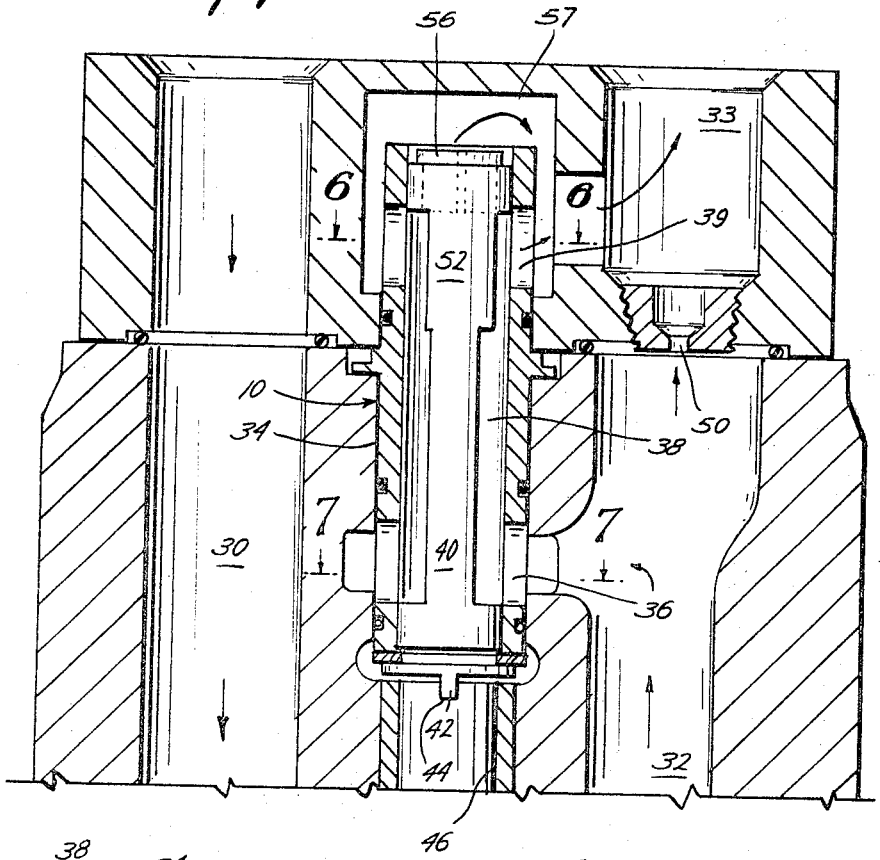
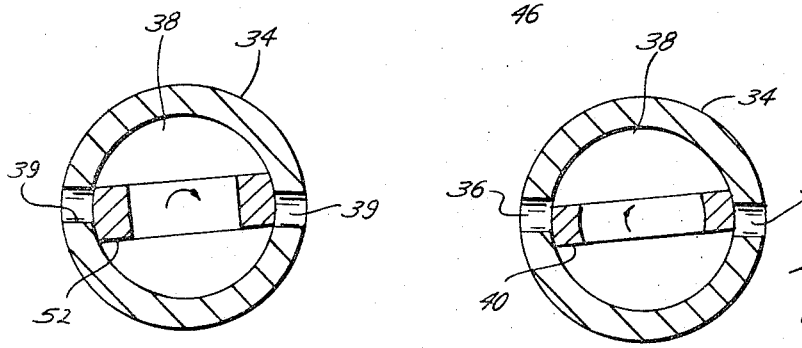
Fig. 5
Fig. 6
Fig. 7
Cecil E. Adams
Jack A. Roll
INVENTORS

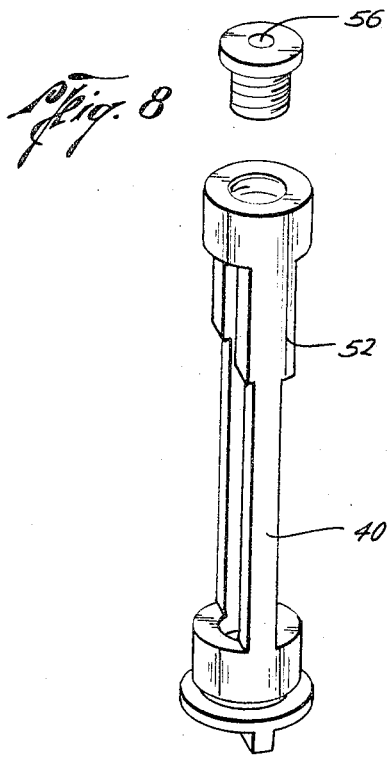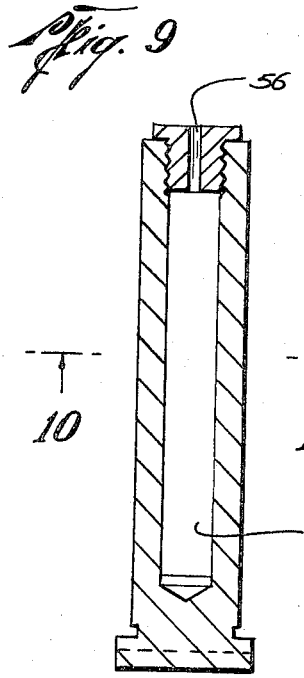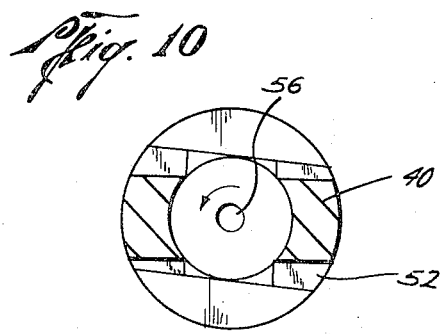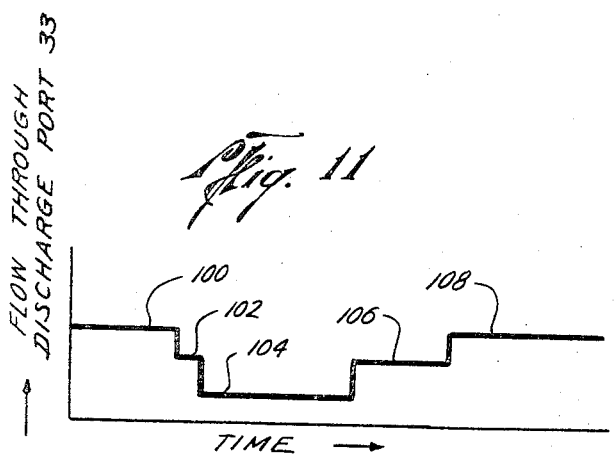
Cecil E. Adams
Jack A. Roll
INVENTORS

3,426,856
CONTROL VALVE FOR LIMITING HYDRAULIC MOTOR SPEEDUP
Jack A. Roll, Bryan, Tex., and Cecil E. Adams, Columbus, Ohio, assignors, by direct and mesne assignments, to Hughes Tool Company, Houston, Tex., a corporation of Delaware
Filed June 9, 1967, Ser. No. 644,850
U.S. Cl. 173—119          7 Claims
Int. Cl. E21c *3/04;* F01l *15/10;* F01c *21/12*

ABSTRACT OF THE DISCLOSURE

A control valve positioned in the fluid outlet of a hydraulic motor and synchronized with the operation of the hydraulic motor restricting the flow of fluid through the motor when the motor is unloaded, thereby limiting the motor speedup. In a hydraulically driven impact tool controlled by a cam follower riding up an inclined cam surface and releasing a hammer by rolling over a cam shoulder, a control valve synchronized with the cam follower so that the valve is closed when the cam follower reaches the cam shoulder, thus restricting fluid flow and reducing speedup of the hydraulic motor, and a restricted passageway in parallel with the control valve allowing limited fluid flow from the hydraulic motor at all times.

Background of the invention

The present invention relates to a control valve for reducing speedup in a hydraulic motor as it is periodically unloaded, and more particularly relates to a control valve for use with a hydraulically driven, cam controlled impact mechanism for limiting the speed of the hydraulic motor as it is rapidly unloaded at the end of each load cycle.

In the past, hydraulically actuated impact mechanisms have been utilized in which a hydraulic motor is provided which rotates a cam follower along a cam surface which includes an inclined surface and an axially aligned shoulder for alternately compressing and releasing a power spring which delivers an impact blow. However, when the cam follower reaches the cam shoulder the load on the hydraulic motor is released, causing the motor to speed up and causing the cam follower to rotate to a position where it may be impacted against the cam and possibly damaged.

Summary

The present invention is directed to providing a valving mechanism which is synchronized with and driven by a hydraulic motor to restrict the fluid flow of the motor at the proper point in a periodic cycle for limiting the motor speedup.

Therefore, it is a general object of the present invention to provide an improved hydraulic valve control mechanism which will reduce rotational speed surges caused by the rapid loading and unloading of the hydraulic motor.

A further object of the present invention is the provision of a first rotary control valve connected to and rotated by the hydraulic motor and positioned in the fluid outlet from the motor and a second rotary hydraulic valve connected to and rotated by the motor and in series with the first rotary valve for periodically restricting the flow of hydraulic fluid from the motor for controlling the motor speed, and provided with one or more restricted passageways in parallel with the rotary valves for allowing limited fluid flow from the motor fluid outlet at all times.

Still a further object of the present invention is the provision of an improvement in a hydraulic motor driven impact tool controlled by a cam follower mating with a cam having an inclined surface and an axially aligned shoulder by providing a valve positioned in the fluid outlet of the hydraulic motor which is synchronized with the cam follower so that the valve opening is restricted when the cam follower moves adjacent the axially aligned cam shoulder to restrict flow from and preventing speedup of the motor, and including a restricted pasageway in parallel to the control valve allowing limited fluid flow from the motor outlet at all times.

Brief description of the drawings

In the attached drawings, like character references refer to like parts throughout the several views in which, FIGURE 1 is an elevational view, partly in cross-section, illustrating the use of a control valve of the present invention in conjunction with a hydraulically driven impact tool, FIGURE 2 is a schematic view of portions of the impact tool shown in FIGURE 1 with the cam follower traveling up the inclined surface of the control cam for compressing the power spring, FIGURE 3 is a schematic view similar to that shown in FIGURE 2 illustrating the sequence of travel of the cam follower as it reaches the axially aligned shoulder of the cam when the hydraulic motor speeds up in the absence of the control valve of the present invention, FIGURE 4 is a schematic view similar to FIGURE 2 illustrating the sequence of travel of the cam follower over the axially aligned cam shoulder when the control valve of the present invention is used to restrict speedup of the hydraulic motor, FIGURE 5 is an enlarged elevational view, in cross-section, illustrating the preferred embodiment of the control valve of the present invention, FIGURE 6 is a cross-sectional view taken along the line 6—6 of FIGURE 5, FIGURE 7 is a cross-sectional view taken along the line 7—7 of FIGURE 5, FIGURE 8 is an enlarged exploded perspective view of the valve spool of FIGURE 5, FIGURE 9 is a cross-sectional view of the spool of FIGURE 8, FIGURE 10 is a cross-sectional view taken along the line 10—10 of FIGURE 9, and FIGURE 11 is a graph illustrating the amount of hydraulic flow through the valve of FIGURES 5–10.

Description of the preferred embodiment

While the control valve of the present invention has various applications in conjunction with controlling the flow of fluid through a hydraulic motor, it will be described for purposes of illustration only in use with a hydraulically actuated impact tool.

Referring to the drawings, and particularly to FIGURE 1, the reference numeral 10a generally indicates the control valve of the present invention as used in one type of impact mechanism. The impact mechanism includes a hydraulic motor 12 having a motor shaft 46 one end of which is connected to and rotates a driving shaft 14 which in turn rotates a cam follower or bearings 16 attached thereto which ride on and over the surfaces of a cam 18 having an inclined surface 19 and an axially aligned shoulder 21 (FIGURES 2, 3 and 4) which provides a dropoff. A power spring 20 is provided which is alternately compressed and released to provide an impact blow. Thus, as the hydraulic motor 12 rotates the driving shaft 14, the bearings 16 connected to the shaft 14 ride up the cam incline 19 thereby compressing the power spring 20 and when they reach the cam shoulder 21 and dropoff, they release the cam 18, thereby allowing the power spring 20 to deliver an impact blow. The hammer assembly 22 includes the hammer 23, the cam 18 and any other dead weight attached to the lower end of the spring 20, all of which is driven downwardly when the power spring 20 is released, thereby providing the impact blow against a member such as a tool 28. No further description of the particular impact tool is necessary as the control valve may be used with any suitable hydraulically driven impact tool such as shown in FIGURE 1 and such impact tool is more fully described in Patent No. 3,186,498, dated June 1, 1965.

As best seen in FIGURE 2, rotation of the hydraulic motor 12 and driving shaft 14 causes the cam follower 16 to roll up the incline portion 19 of the cam 18 moving the hammer assembly 22 upwardly and compressing the spring 20 until the roller reaches the axially aligned shoulder 21 of the cam 18 whereby the hammer assembly 22 is released, is driven downwardly by the spring 20, and provides an impact blow against the tool 28. However, as the hydraulic motor rotates the bearings 16 along the incline surface 19, compressing the power spring 20, the motor 12 is under heavy load and tends to slow down. Moreover, after the bearings 19 reach the peak of the incline surface 19, adjacent the shoulder 21, the bearings 16 are free from the cam surface, the motor is suddenly unloaded, and the built up hydraulic pressure on the motor causes a speeding up of the motor. Thus, instead of following a path of travel approximating the curvature of the cam 18, the bearings 16, as best seen in FIGURE 3, follow a path of travel from position A at the peak of the incline surface 19 and are rotated by the speeded up motor to position B and then to position C. Thus, the speedings up of the hydraulic motor 12 rotates the bearings 16 to a path of travel as sequentially indicated in positions A, B and C whereby the cam 18, which is at this time moving downwardly by the action of the power spring 20, impacts on the bearings 16, rather than the hammer assembly 22 impacting on the tool 28, thus causing the bearings 16 to fail.

The present invention, the control valve 10, as will be more fully described hereinafter, is provided to control the flow of hydraulic fluid through the motor 12 and thus control the speed of the hydraulic motor and thus the bearings 16 so that they will follow a path of travel as indicated in FIGURE 4 in sequential positions A', B' and C' and D'. That is, after the bearing reaches the peak of the incline surface 19 of the cam 18 the speed of the hydraulic motor is restricted to prevent its speeding up to an undesirable extent and thus allows the spring 20 to drive the hammer 23 downwardly against the tool 28 without impacting the bearings 16 against the surface of the cam 18.

Referring now to FIGURES 5-10, the structure of one embodiment of the control valve of the present invention is best seen. A fluid inlet 30 is provided leading to the hydraulic motor 12 from a hydraulic source of power (not shown) to actuate the hydraulic motor 12 and a fluid outlet 32 is provided returning from the hydraulic motor 12 and returning to a discharge outlet 33 and to the power source. The control valve 10 includes a valve generally consisting of a housing 34 having one or more inlet ports 36 in communication with the fluid outlet 32. Thus most of the fluid from the fluid outlet 32 will flow into the port 36 and into a valve chamber 38. A first rotatable valve member or spool 40 is rotatably mounted in the housing 34 and as it rotates it periodically opens and closes the ports 36. Valve member 40 is keyed up any suitable means such as a key 42 and a key way 44 to the shaft 46 of the hydraulic motor 12. Since the shaft 46 of the motor 12 is connected to the rotating shaft 14, the valve member 40 is in effect connected to and rotates simultaneously with the bearings 16. The valve member 40 is synchronized with the bearings 16 so that the valve member will close the ports 36 at a time when the bearings 16 move adjacent the peak of the incline 19 of the cam 18 or positions A and A' (FIGURES 3 and 4) to restrict the flow of the hydraulic fluid output from the motor 12 through the fluid outlet 32 and cause the motor to slow or hesitate. In order to prevent stoppage entirely of the fluid output from the motor 12, a suitable bypass passageway is provided in parallel with the valve 44 such as an orifice 50 in communication between the fluid outlet passageway 32 and discharge 33 leading to the power source. Thus, the orifice 50 is sized to allow a minium flow of hydraulic fluid so that the valve member 40 does not stop the hydraulic motor entirely, and thus prevents a creation of a hydraulic block or buildup of high pressures in the system when the valve member 40 closes off the ports 36. In addition, orifice 50 allows the valve member 40 to rotate past dead center and prevent a complete stoppage of the hydraulic motor 12.

In addition, a second rotary valve 52 may be provided inside of the housing 34 if desired. Thus the valve member 52 may be connected to the valve member 40 and is part of the same valve spool and therefore rotates in synchronization with the bearings 16 and periodically closes the outlet ports 39 leading from the chamber 38 to the discharge outlet 33 for blocking the flow of hydraulic fluid from the hydraulic motor similarly to the action of valve element 40. However, it is noted from a comparison of FIGURES 6 and 7 that the valve element 52 is wider than the valve element 40 and therefore closes before valve element 40 and remains closed for a period of time after valve element 40 opens. In addition, a second orifice 56 is provided in communication between the valve chamber 38 and the discharge outlet 33 through passageway 57 and is thus in parallel with the port 39 to allow limited fluid flow out of the valve even when the valve element 52 closes the ports 39. Thus, the valve element 52 and orifice 56 act to feather or choke down the flow of hydraulic fluid from the hydraulic motor 12 prior to the closing of valve element 40 and act to provide a smoother cutdown in the motor speed to prevent any abrupt hydraulic impact or pressure buildup in the system.

As more clearly seen in FIGURES 8-11, the valves 52 and 40 may be rotationally displaced relative to each other, if desired, to change the feathering characteristics. As shown, the second valve 52 is rotationally displaced from valve 40 by a few degrees, in the direction opposite to the direction of rotation of the spool. Thus as best seen in FIGURE 11, the normal volume of hydraulic flow through the hydraulic motor 12 is indicated by the graph at level 100, but when valve 52 closes ports 39, the level drops down to level 102, and only a short time later due to the small rotational displacement between the leading edge of valve 52 relative to valve 40, valve 40 will close off ports 36 to further decrease the hydraulic level flow through the motor to level 104. As valve 40 rotates past the ports 36 the hydraulic level will again increase to a level 106, and after a further time valve 52 will rotate past ports 30 and the level will rise to 108 equal to the normal hydraulic flow rate level 100. By having valve 52 displaced and leading valve 40 a small amount, a quick slow down in motor speed will be obtained at the critical time of the bearings 16 moving across the peak of the cam 18, but the slow down will still be in multiple steps so as to feather the system.

The valve 10a shown in FIGURE 1 is the same as valve 10 shown in FIGURE 5, but the second rotary valve 52 and orifice 56 is omitted. Thus, the fluid flows directly from valve chamber 38 to discharge outlet 33 by way of the open upper end of valve spool 40.

In operation, a suitable hydraulic source (not shown) is connected to the fluid inlet 30 and thus through the inlet of the hydraulic motor 12 which then rotates and in turn rotates the driving shaft 14. The rotation of the driving shaft 14 consequently rotates the bearing follower 16 which coacts with the cam 18 thereby moving the hammer assembly longitudinally and compressing the spring 20. As the bearing followers 16 rotate over the axially aligned cam shoulder 21, the hammer assembly is released and the energy stored in the spring 20 accelerates the hammer assembly downwardly to provide an impacting blow against element 28.

In order to prevent the bearing 16 from following the path of travel as shown in positions A, B and C as indicated in FIGURE 3, but instead following a path of travel as indicated by sequential A, B' C' and D' of FIGURE 4, the control valve 10 of the present invention prevents the motor from speeding up as the bearing 16 reach the shoulder 21 of the cam 18. Thus, the valve member 40 which is synchronized with the bearing 16 closes the ports 36 and the fluid outlet 32 leading from the hydraulic motor, causing the motor to slow down or hesitate when the bearing 16 reaches the shoulder 21. In order to prevent complete stoppage of the hydraulic motor and an undesirable hydraulic block or high pressures in the system, a limited amount of flow from the fluid outlet 32 passes through an orifice 50 to the discharge outlet 33 and returns to the power source. As the valve element 40 is rotated past the ports 36, fluid again will flow through the ports 36 into the valve chamber 38, out the ports 39 to the discharge passageway 33. It is desired to further feather or restrict the speed up of the hydraulic motor 12, the additional valve element 52 (FIGURES 5, 6, 8 and 9) may be utilized which acts to close the ports 39 prior to closure of the ports 36 by the valve element 40 and keeps the ports 39 closed for a longer period of time. The additional orifice 56 provides a bypass around the ports 39 through the passageway 57 and to the discharge outlet 33 to reduce the abruptness and hydraulic shock to the hydraulic system.

The present invention, therefore, is well adapted to carry out the objects and attain the ends and advantages mentioned as well as others inherent therein. While presently preferred embodiments are given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. In an impact tool having a housing, a driving shaft mounted in the housing for rotation relative to the housing, a hydraulic motor having a fluid inlet and fluid outlet and connected to and rotating said shaft, a hammer assembly in the housing and connected to the shaft for axial movement relative to said shaft, a cam in the housing assembly, at least one cam follower connected to said shaft and positioned to mate with said cam, a spring in said housing urging said hammer assembly in one direction, said cam including an inclined surface and an axially aligned shoulder permitting sudden axial travel to the hammer assembly in said one direction, the improvement in a control valve comprising, said valve positioned in the fluid outlet from the hydraulic motor therein, said valve synchronized with the cam follower so that the valve is closed when the cam follower reaches the axially aligned cam shoulder thereby restricting fluid flow from and preventing speed up of the motor, but is opened for other positions of the cam follower relative to the cam, and a restricted passageway in the fluid outlet in parallel to the control valve allowing limited fluid flow from the fluid outlet at all times.

2. A control valve for a hydraulic motor comprising, a first rotary hydraulic valve connected to and rotated by said motor, said valve positioned in the fluid outlet from the hydraulic motor, a second rotary hydraulic valve connected to and rotated by said motor, said second valve positioned in series with the first rotary valve, a first restricted passageway in the fluid outlet in parallel to the first and second valves and allowing limited fluid flow through the fluid outlet at all times, and a second restricted passageway in parallel with the second valve.

3. The apparatus of claim 2 wherein the second valve is adapted to close before the first valve and remain closed for a period of time after the first valve opens.

4. The apparatus of claim 3 wherein the second valve is rotationally displaced from the first valve in a direction opposite to the direction of rotation of said first and second valves.

5. In an impact tool having a housing, a driving shaft mounted in the housing for rotation therein, a hydraulic motor having a fluid inlet and fluid outlet and connected to and rotating said shaft, a hammer assembly in the housing and positioned for axial movement relative to said shaft, a cam in the housing, at least one cam follower connected to the shaft and positioned to mate with said cam, a spring in said cam including an inclined surface and an axially aligned shoulder permitting sudden axial travel of the hammer assembly in said one direction, the improvement in a control valve for reducing speed-up of the motor when the cam follower reaches the axial cam shoulder comprising, a first rotary valve positioned in the fluid outlet from the hydraulic motor, said valve connected to and synchronized with the cam follower so that the valve is closed when the cam follower reaches the axially aligned cam shoulder, but is opened for other positions of the cam follower relative to the cam, a second rotary hydraulic valve connected to and synchronized by said cam follower, said second valve positioned in series with the first rotary valve, a first restricted passageway in the fluid outlet in parallel with the first and second valves allowing limited fluid flow through the fluid outlet at all times, a second restricted passageway in parallel with the second valve, said second valve adapted to close before the first valve and remain closed after the first valve opens.

6. The apparatus of claim 5 wherein the second valve is rotationally displaced from the first valve in a direction opposite to the direction of rotation of said first and second valves.

7. A control valve for cyclically limiting fluid flow through a hydraulic motor comprising, a rotary hydraulic valve connected to and rotated by said motor, said valve positioned in the motor fluid outlet and cyclically closing for limiting fluid flow and slowing said motor, and a restricted passageway in the fluid outlet allowing limited fluid flow through the fluid outlet at all times thereby preventing hydraulic lock and stoppage of the motor.

References Cited

UNITED STATES PATENTS

| | | | |
|---|---|---|---|
| 2,476,632 | 7/1949 | Shaff | 173—118 X |
| 2,821,276 | 1/1958 | Reynolds | 173—93.6 |
| 3,068,973 | 12/1962 | Maurer | 173—93.6 |

ERNEST R. PURSER, Primary Examiner.

U.S. Cl. X.R.

91—246, 76